United States Patent [19]
Willis

[11] Patent Number: 5,680,167
[45] Date of Patent: Oct. 21, 1997

[54] PRINTING APPARATUS AND METHOD FOR TRI-LEVEL COLOR IMAGING

[75] Inventor: Roger L. Willis, Churchville, N.Y.

[73] Assignee: Eastman Kodak Company, Rochester, N.Y.

[21] Appl. No.: 817,022

[22] Filed: Jan. 3, 1992

[51] Int. Cl.⁶ .......................... G01D 15/14; G01D 15/06
[52] U.S. Cl. .................. 347/115; 347/116; 347/129
[58] Field of Search ................. 346/160, 107 R, 346/1.1, 155, 157; 347/115, 116, 129

[56] References Cited

U.S. PATENT DOCUMENTS

| | | | |
|---|---|---|---|
| 3,832,488 | 8/1974 | Fahey et al. | 347/129 |
| 4,078,929 | 3/1978 | Gundlach | 430/42 |
| 4,251,822 | 2/1981 | Hara et al. | 346/139 C |
| 4,596,995 | 6/1986 | Yamakawa et al. | 346/160 |
| 4,602,262 | 7/1986 | Milligan et al. | 346/160 |
| 4,728,983 | 3/1988 | Zwadlo et al. | 346/157 |
| 4,734,714 | 3/1988 | Takasu et al. | 347/129 |
| 4,743,927 | 5/1988 | Susaki | 346/160 |
| 4,768,046 | 8/1988 | Minor et al. | 346/157 X |
| 4,814,797 | 3/1989 | Haneda et al. | 346/157 |
| 4,835,551 | 5/1989 | Ng | 347/129 |
| 4,885,597 | 12/1989 | Tschang et al. | 346/107 R |
| 4,888,603 | 12/1989 | Hart et al. | 346/160 |
| 4,903,048 | 2/1990 | Harrington | 346/157 |
| 4,963,989 | 10/1990 | Morton | 347/129 |
| 4,998,139 | 3/1991 | May et al. | 355/208 |
| 4,999,673 | 3/1991 | Bares | 355/208 |
| 5,006,868 | 4/1991 | Kinoshita | 346/157 |
| 5,019,859 | 5/1991 | Nash | 355/77 |
| 5,040,003 | 8/1991 | Willis | 346/157 |
| 5,059,984 | 10/1991 | Moore et al. | 346/1.1 |
| 5,083,144 | 1/1992 | Altmann | 346/157 |
| 5,111,218 | 5/1992 | Lebeau et al. | 346/107 R |
| 5,113,202 | 5/1992 | Loce et al. | 346/108 |
| 5,121,146 | 6/1992 | Smith et al. | 346/160 |
| 5,134,495 | 7/1992 | Frazier et al. | 358/298 |
| 5,182,575 | 1/1993 | Kato et al. | 346/108 |

*Primary Examiner*—Michael L. Gellner
*Assistant Examiner*—Randy W. Gibson
*Attorney, Agent, or Firm*—Norman Rushefsky

[57] ABSTRACT

A non-impact printing apparatus and method for tri-level color xerographic recording. A binary printhead having M recording elements per inch is used to record each mainscan line (1/M lines per inch) of pixels using two sublines for recording each mainscan line. In a first embodiment, pixels to be developed in a first color are recorded during a first subline, and during a second subline of pixels to be developed in a second color are recorded using a different exposure duration from that used in recording the first subline of pixels. In a second embodiment, pixels of the first and second colors are recorded during a first subline and supplementary exposure is provided for completing the recording of pixels of the second color during a second subline of recording.

7 Claims, 6 Drawing Sheets

PRINTING APPARATUS AND METHOD FOR TRI-LEVEL COLOR IMAGING

BACKGROUND OF THE INVENTION

1. Field of the Invention

The invention relates to electrophotography and more particularly to printing apparatus and methods for plural levels of color imaging.

2. Description Relative To The Prior Art

In the practice of conventional xerography, it is the general procedure to form electrostatic latent images on a charge retentive surface such as photoconductive member by first uniformly charging the charge retentive surface. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past a single developer housing. The toner is generally a colored powder which adheres to the charge pattern by electrostatic attraction. The developed image is then fixed to the imaging surface or is transferred to a receiving substrate such as plain paper to which it is fixed by suitable fusing techniques.

In tri-level, highlight color imaging, unlike conventional xerography, not only are the charged (i.e., unexposed) areas developed with toner but the discharged (i.e., fully exposed) images are also developed. Thus the charge retentive surface contains three voltage levels which correspond to two image areas and to a background voltage area. One of the image areas corresponds to non-exposed (i.e. charged) areas of the photoreceptor as in the case of conventional xerography, while the other image areas correspond to fully exposed (i.e., discharged) areas of the photoreceptor.

Tri-level, highlight color xerography as described in U.S. Pat. No. 4,078,929 issued in the name of Gundlach employs the use of tri-level xerography as a means to achieve single-pass highlight color imaging. As disclosed therein the charge pattern is developed with toner particles of first and second colors. The toner particles of one of the colors are positively charged and the toner particles of the other color are negatively charged.

In highlight color xerography the xerographic contrast on the charge retentive surface or photoreceptor is divided three, rather than two, ways as is the case in conventional xerography. The photoreceptor is charged, typically to 900v. It is exposed imagewise, such that one image corresponding to charged image areas (which are subsequently developed by charged-area development, i.e. (CAD) remains at or near the fully charged photoreceptor potential represented by $V_{cad}$. The other images are formed by discharging the photoreceptor to its residual potential, i.e. $V_{dad}$ (typically 100 v) which corresponds to discharged area images that are subsequently developed by discharged-area development (DAD). The background areas are formed by discharging the photoreceptor to reduce its potential to halfway between the $V_{cad}$ and $V_{dad}$ potentials, (typically 500 v) and is referred to as $V_{white}$ or $V_w$.

In order to modulate the initial uniform electrostatic charge on the photoreceptor the prior art suggests, see for example U.S. Pat. No. 4,998,139, a three-level laser raster output scanner that outputs light selectively at two different levels as well as a no or low light level output. A problem in using a laser ROS is that they tend to be expensive. Less expensive exposure devices used in electrophotography include light emitting diode printhead arrays. However, in order to provide three levels of output from these devices they too become expensive. So-called binary LED printheads are readily available and relatively inexpensive but, with only two levels of output (on or off) they would appear not to be suited to tri-level color imaging.

SUMMARY OF THE INVENTION

It is an object of the invention to provide a relatively inexpensive tri-level color imaging apparatus and method. The invention provides a method and apparatus for recording in two colors. The method and apparatus records an electrostatic image using a binary printhead having a plurality of recording elements. During each main scan line, two or more sublines of data are recorded and the pixels recorded are developed with two or more differently colored toners. The use of a binary printhead thus obviates the need for a recording device that has more than one level of "on".

Various means for practicing the invention and other advantages and novel features thereof will be apparent from the following description of illustrative preferred embodiments of the invention, reference being made to the accompanying drawings.

DETAILED DESCRIPTION OF THE PREFERRED EMBODIMENTS

The invention will now be described with reference to a printing apparatus that is similar to those known in the prior art and for example described in greater detail in U.S. Pat. No. 4,998,139, the contents of which are incorporated herein by this reference. It will become apparent, however, that through the modifications to be described below that an improved printing apparatus is provided that is less expensive to manufacture. Because electrophotographic reproduction apparatus are well known, the present description will be directed in particular to elements forming part of or cooperating more directly with the present invention. Apparatus not specifically shown or described herein are selectable from those known in the prior art.

Figure 1:
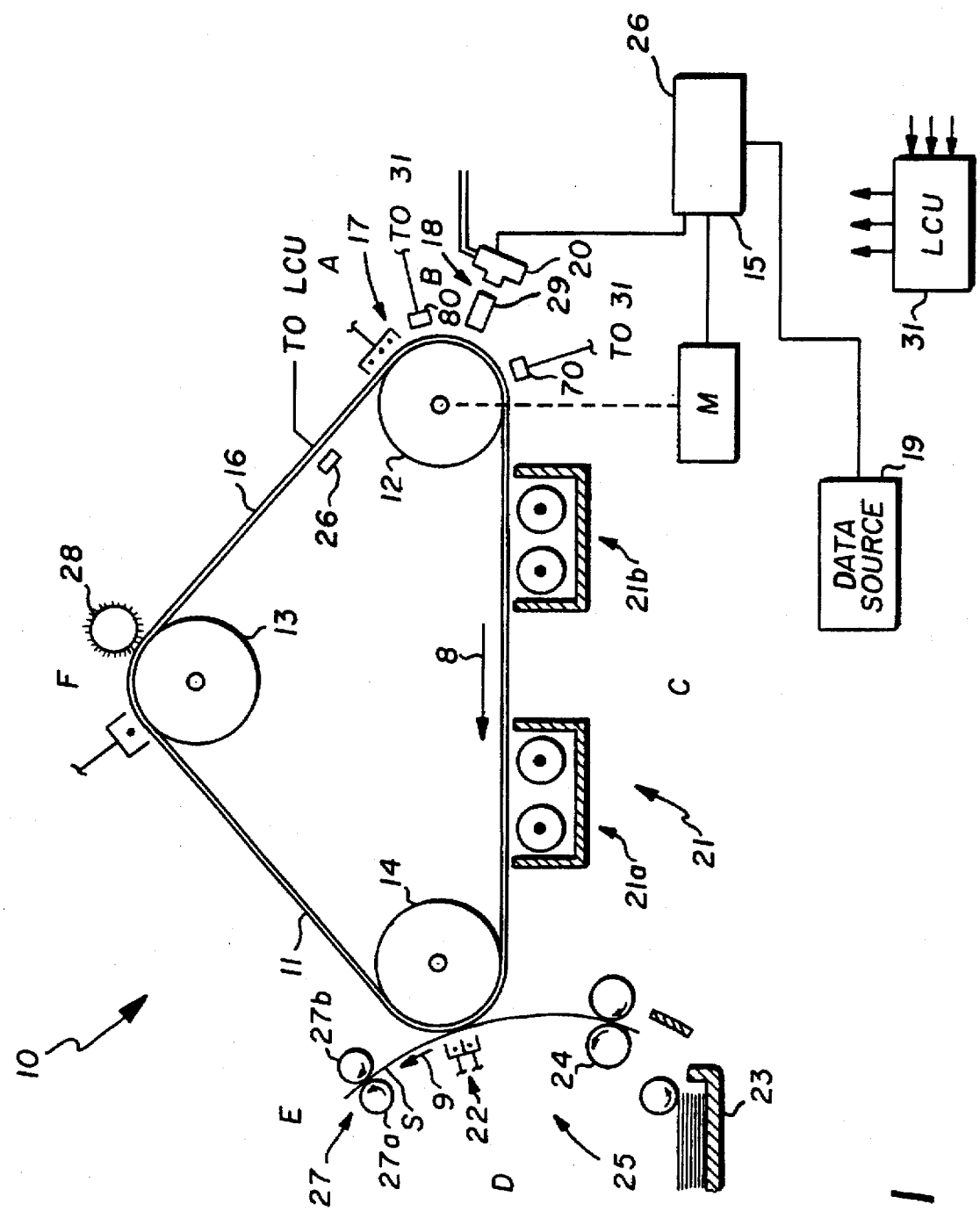
FIG. 1 is a schematic illustration of a printing apparatus including a printhead driven in accordance with the inventive features of the invention.

As shown in FIG. 1, a printing apparatus 10 incorporating the invention may utilize a charge retentive member in the form of a photoconductive belt 11 consisting of a photoconductive surface and an electrically conductive, light transmissive substrate and mounted for movement past a plurality of operative processing stations. Belt 11 moves in the direction of arrow 8 to advance successive portions thereof sequentially through the various processing stations disposed about the path of movement thereof. Belt 11 is entrained about a plurality of rollers 12, 13 and 14, the former of which can be used as a drive roller and the latter of which can be used to provide suitable tensioning of the photoreceptor belt 11. Motor, M, rotates roller 12 to advance belt 11 in the direction of arrow 8. Roller 12 is coupled to motor M by suitable means such as a belt drive.

As can be seen by further reference to FIG. 1, initially successive portions of belt 11 pass through charging station A. At charging station A, a corona discharge device such as a scorotron, corotron or dicorotron indicated generally by the reference numeral 17, charges the belt 11 to a selectively high uniform positive or negative potential, $V_o$. Any suitable control, well known in the art, may be employed for controlling the corona discharge device 17.

Next, the charged portions of the photoreceptor surface are advanced through exposure station B. At exposure station B, the uniformly charged photoreceptor or charge retentive surface 11 is exposed to an LED printhead device 20 which causes the charge retentive surface to be discharged or imagewise modulated in accordance with the output from the device 20. The printhead device is a two level or binary device as will be described in further detail below. A printhead control electronics 26 converts a previously stored image into the appropriate control signals for the printhead device in an imagewise fashion. The resulting photoreceptor and more specifically an image frame thereof contains both charged-area (CAD) images and discharged-area images (DAD) as well as background areas $V_w$.

The photoreceptor, which is initially charged to a voltage $V_o$, undergoes dark decay to a level $V_{cad}$ equal to about $-900$ volts. When exposed at the exposure station B it is discharged to $V_{dad}$ equal to about $-100$ volts in the highlight (i.e. color other than black) color parts of the image. The photoreceptor is also discharged to $V_w$ equal to $-500$ volts imagewise in the background (white) image areas and in the inter-document area. After passing through the exposure station, an image frame of the photoreceptor contains charged areas and discharged areas which correspond to CAD and DAD latent images.

At development station C, a development system, indicated generally by the reference numeral 21 advances developer materials into contact with the CAD and DAD electrostatic latent images. The development system 21 comprises first and second developer apparatus 21a and 21b. The developer apparatus 21a comprises a housing containing a pair of magnetic brush rollers. The rollers advance developer material which by way of example contains positively charged black toner mixed with carrier beads which are preferably conductive. Electrical biasing is accomplished via a power supply (not shown) that is electrically connected to developer apparatus 21a. A DC bias of approximately $-600$ volts is applied to the rollers via this power supply 41.

The developer apparatus 31b also comprises a housing containing a pair of magnetic brush rollers. The rollers advance developer material into contact with the photoreceptor for developing the discharged-area images. The developer material by way of example contains negatively charged red toner for developing the discharged-area images. The red developer, like the black developer, is preferably conductive. Appropriate electrical biasing is accomplished via the power supply that is also electrically connected to developer apparatus 21b. A suitable DC bias of approximately $-400$ volts is applied to the rollers via this bias power supply.

Because the composite image developed on an image frame of the photoreceptor consists of both positive and negative toners, a typically positive pre-transfer corona discharge member (not shown) is provided to condition the toners for effective transfer to a substrate using positive corona discharge. The pre-transfer corona discharge member is preferably an ac corona device biased with a dc voltage to operate in a field sensitive mode and to perform tri-level xerography pre-transfer charging in a way that selectively adds more charge (or at least comparable charge) to the part of composite tri-level image that must have its polarity reversed compared to elsewhere. This charge discrimination is enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material S is moved into contact with the toner image at transfer station D. The sheet of support material is advanced, from a hopper containing a stack of discrete sheets, to transfer station D by conventional sheet feeding apparatus represented by rollers 24. The discrete sheets may consist of plain paper or transparencies.

The sheet feeding apparatus includes a feed roller contacting the uppermost sheet of a stack of copy sheets. Feed rollers rotate so as to advance the uppermost sheet from the stack into a chute which directs the advancing sheet of support material into contact with the photoconductive surface of belt 11 in a timed sequence so that the toner powder image developed thereon contacts the advancing sheet of support material at transfer station D.

Transfer station D and generally designated 25 includes a corona generating device 22 which sprays ions of a suitable polarity onto the backside of sheet S. This attracts the charged toner powder images of both colors from the belt 11 to the front side of sheet S. After transfer, the sheet continues to move, in the direction of arrow 9, onto a conveyor (not shown) which advances the sheet to fusing station E.

Fusing station E includes a fuser assembly, indicated generally by the reference numeral 27, which permanently affixes the transferred powder image to sheet 58. Preferably, fuser assembly 27 comprises a heated fuser roller 27a and a backup roller 27b. Sheet S passes between fuser roller 27a and backup roller 27b with the toner powder image contacting fuser roller 27a. In this manner, the toner powder image consisting of toners of both colors is permanently affixed to the frontside of sheet S. After fusing, a chute, not shown, guides the advancing sheet S to a catch tray, also not shown, for subsequent removal from the printing machine by the operator.

After the sheet of support material is separated from photoconductive surface of belt 11, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roller structure 28 for causing carrier particles in the cleaner housing to form a brush-like orientation relative the roller structure and the charge retentive surface. It also may include a pair of detoning rollers for removing the residual toner from the brush. Other cleaning systems, such as fur brush or blade, are also suitable.

Subsequent to cleaning, a discharge lamp 26 floods the photoconductive surface with light to dissipate any residual electrostatic charge remaining prior to the charging thereof for the successive imaging cycle.

Stabilization of the white or background discharge voltage level is accomplished by monitoring photoreceptor white discharge level in the inner-document area of the photoreceptor using an electrostatic voltmeter 70. The information obtained thereby is utilized by a logic and control unit (LCU) 31 to control the level of current to the LEDs of the printhead device 20 so as to maintain the white discharge level at a predetermined level.

The LCU 31 may include any well known element which provides a reference voltage representative of a predetermine white voltage level. The LCU compares the voltage value sensed by the voltmeter 70 to the predetermined value and generates a signal which is used to control the output of the LEDs to thereby maintain the white discharge level at the predetermined level. Correction of the white level output of the LEDs is timed by the LCU such that correction is precluded from taking place within an image frame in order to avoid white level gradients in the image frame, in this regard reference may be had to U.S. Pat. No. 4,885,597 to Tschang et al. which discusses means for changing current levels generated by LED drivers.

Figure 2:
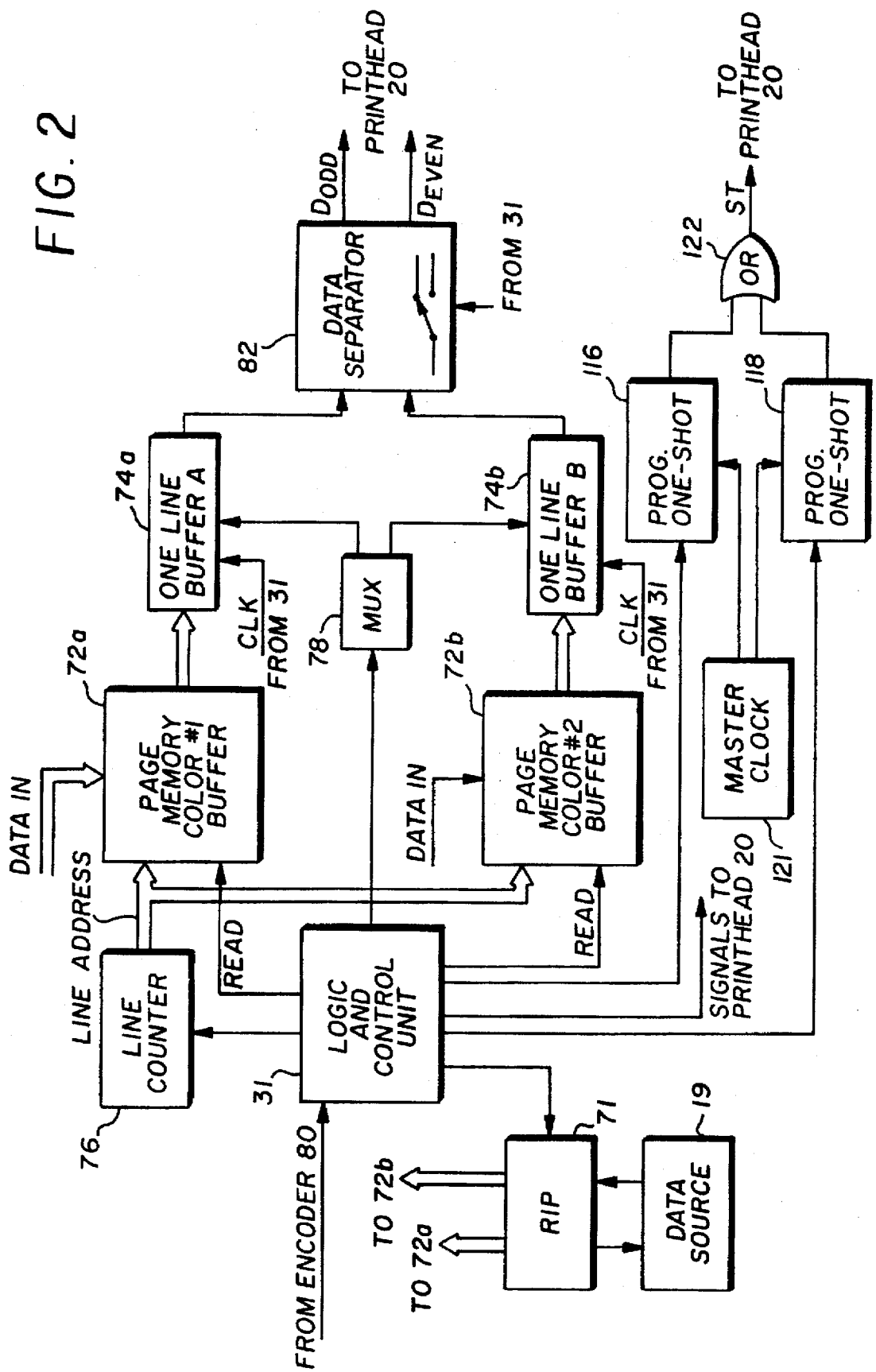
FIG. 2 is a block diagram of an electronic system for driving a printhead used in the printing apparatus of FIG. 1.
Figure 3:
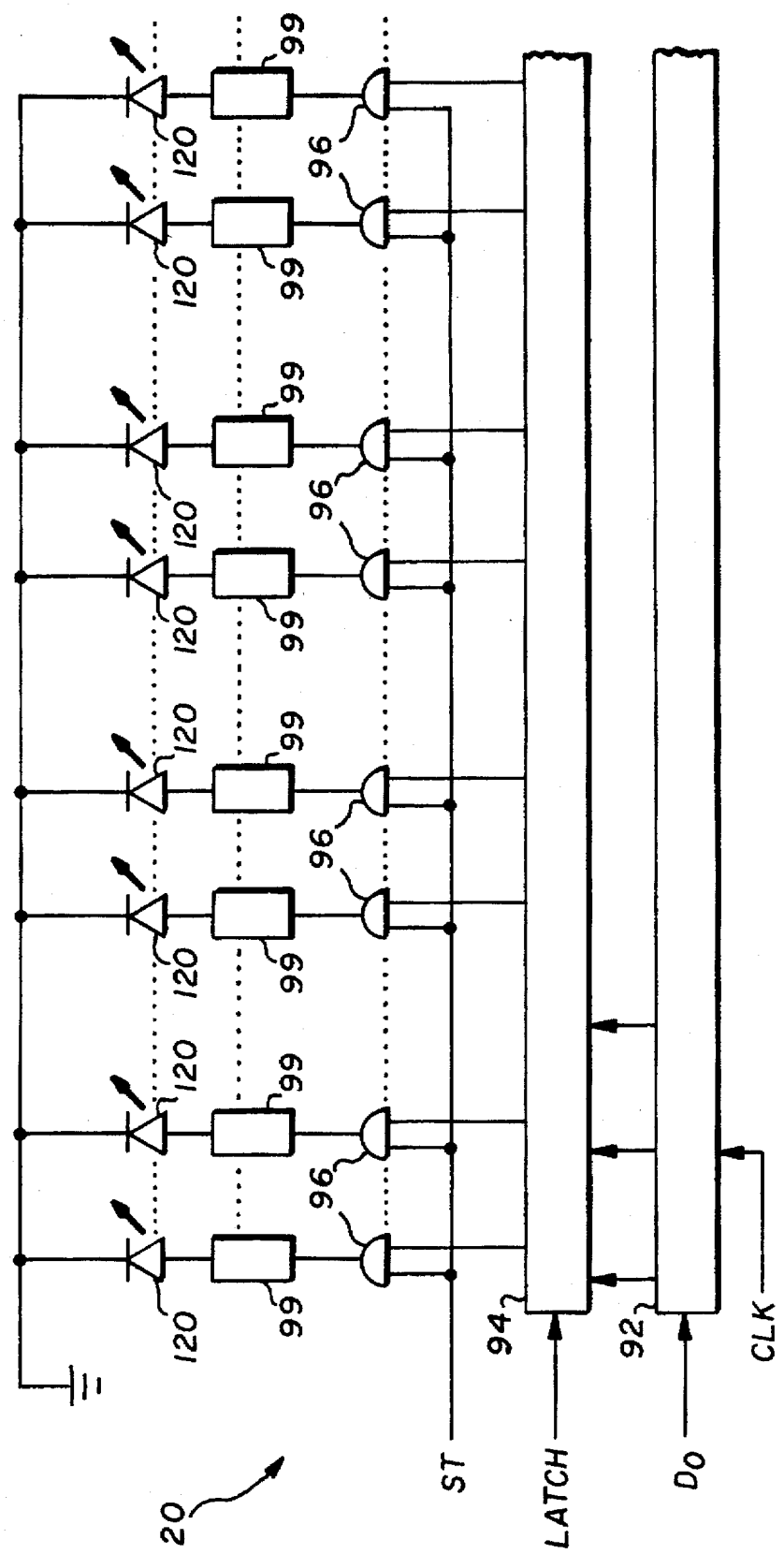
FIG. 3 is a block diagram illustrating elements forming the printhead used in the printing apparatus of FIG. 1.

With reference to both FIGS. 2 and 3, the printhead 20, as noted, is provided with a multiplicity of energizable point-like radiation sources 120, preferably light-emitting diodes (LEDs). Optical means 29 may be provided for focusing light from each of the LEDs onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

With particular reference to U.S. Pat. No. 4,885,597 to Tschang et al, the printhead 20 comprises a suitable stationary support with a series of LED chip arrays mounted thereon. As is well known, each of the LED chip arrays includes, for example, 128 LEDs arranged in a single row. These chips are also arranged end-to-end in a row and where say thirty-eight LED chip arrays are so arranged, the printhead will extend across the width of the web 12 and include 4864 LEDs arranged in a single row. To each side of this row of LEDs there may be provided, for example, thirty-eight identical driver chips. Each of these driver chips include circuitry for addressing the logic associated with each of 64 LEDs to control whether or not each of the LEDs controlled by that driver chip. Two driver chips are thus associated with each LED chip array. Each of the two driver chips will be coupled for driving of alternate LEDs, i.e., one of the driver chips will drive the even numbered LEDs and the other driver chip will drive the odd numbered LEDs in a particular LED chip array. Thus, one driver chip will drive the 64 odd numbered LEDs of the 128 LEDs in the array and the other driver chip will drive the 64 even numbered LEDs of these 128 LEDs. Only some of the odd numbered LEDs are illustrated in FIG. 3, it being understood that many more LEDs are present.

The printhead is a binary printhead, i.e., each recording element is capable of being either turned on or kept off. As is typical for a binary printhead a series of single bits of data (Do) representing one line of binary odd data bits to be printed in the mainscan direction is shifted down a cascaded shift register 92 in response to clock signals (CLK). It will be appreciated that since in this example the printhead has its driver chips divided into odd and even groups that the shift register 92 can store 2432 single bits of binary data, i.e. binary 1's and 0's. Similarly a shift register on the other side of the array of LEDs can store 2432 single bits of data for driving the even numbered LEDs. In response to a latch signal the data is transferred to a latch register 94. In response to a strobe signal the data for each LED enables a driver circuit 99 through a logic AND gate 96 to provide driving current to respective LEDs 120. For example where the shift register element for a particular LED stores a binary value 1 an LED will be selected to be enabled to emit light and where a shift register element for an LED stores a binary value 0 that LED will not be driven to emit light during a subline of a mainscan exposure period for creating a pixel or picture element. Note that the odd and even LEDs are enabled simultaneously when printing a subline of pixels.

With reference now to FIG. 2, the printhead control electronics 26 is illustrated. Data from a data source 19, say a computer, may be rasterized by a raster image processer (RIP) 71. The RIP 71 distinguishes between which data is to be printed in say black and which data is to be printed in say red. Alternatively, the data may be derived from a scanner that scans a document and provides rasterized data. Assume that black is color #1 and that red is color #2. The RIP also transforms the coded data into binary form suitable for printing by the printhead 20. The binarized data for each color is stored respectively in page memory buffers 72a and 72b. In response to a READ signal input to each page memory buffer a line of data to be printed is shifted to a respective one-line buffer 74a, 74b. A line counter 76 in response to signals from the LCU increments a count representing a line address to be output by buffers 72a, 72b. In response to a signal from an encoder 80 that senses an incremental advancement of the photoconductive belt 11 (or the shaft used in driving same) in the subscanning direction (arrow 8), which direction is transverse to the direction of the row of LEDs of the recording head, the LCU 31 selects the output of a line of data to be printed by the printing apparatus. In this regard the LCU emits a signal to multiplexer 78 to select one of the line buffers 74a or 74b from which data is to be output to the printhead 20. Prior to being serially output to the printhead the data is separated by a switching circuit 82 into odd and even data for shifting to respective odd and even shift registers 92 on the printhead 20.

Figure 4:
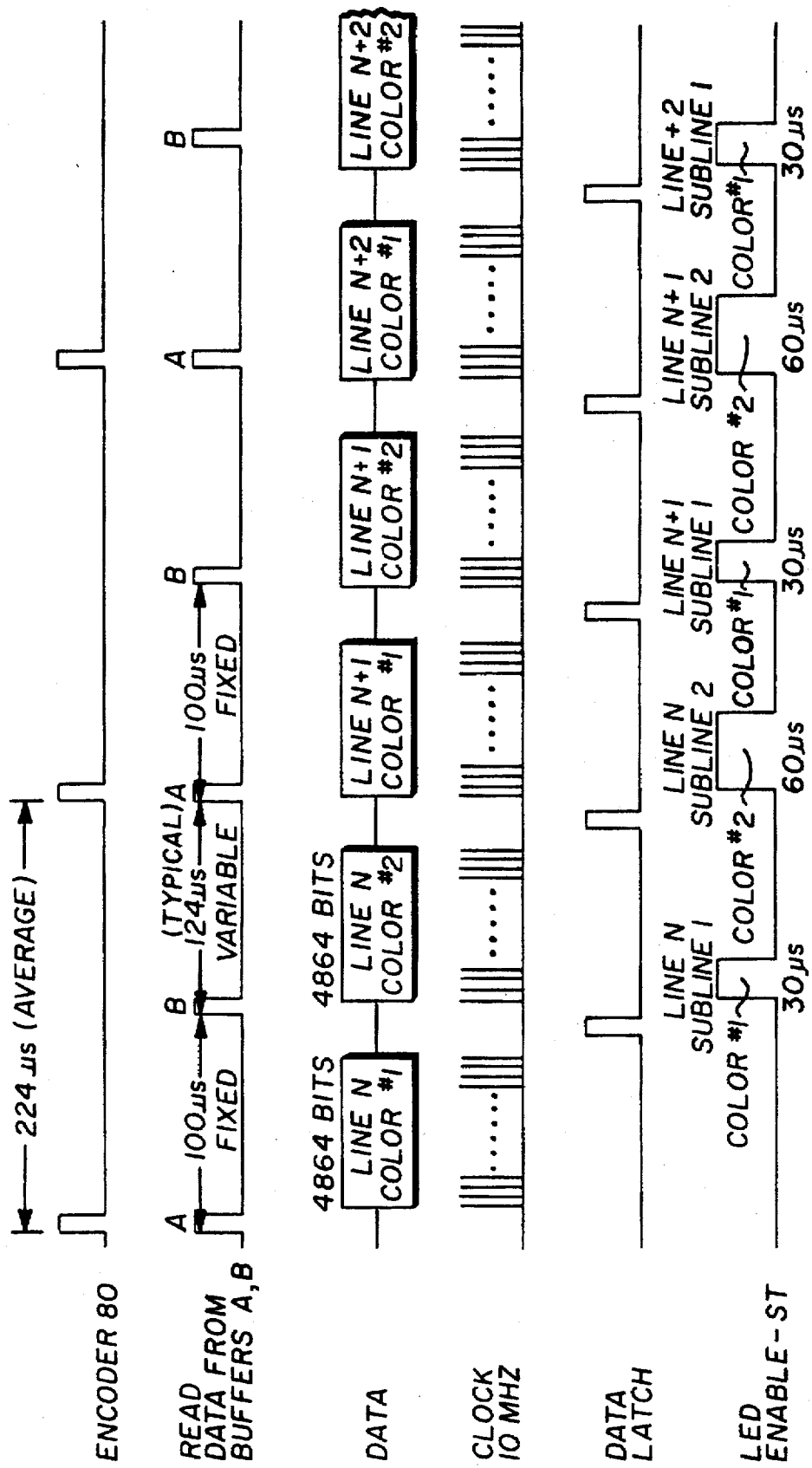
FIG. 4 is a diagram illustrating the timing of certain signals used in printing with the printhead used in the printing apparatus of FIG. 1.

With reference to FIG. 4 it may be seen that the data output from buffer A, 74a, is of 4864 bits and is serially output in a fixed period of time of say 100 μs. This is almost one-half of 224 μs which is the average time period between encoder pulses when the printing apparatus is operating at its normal speed. Where the LED printhead has a row of LEDs arranged across the width of the web 11 at 300 LEDs to the inch the dimension for generation of encoder pulses will also be for each 1/300th's of an inch of web travel in the subscanning direction. The data for line N that has now been clocked out to the printhead represents data of a row of pixels to be recorded in a subline for the color #1 which in this example is black. That is where a binary 0 is provided as a recording bit the corresponding LED will not be enabled and the respective pixel area on the web 11 will develop with black toner. Where the LED is enabled by a binary 1 data signal the web 11 will be partially discharged and record background or white. It may be seen in FIG. 4 that for line N subline 1 the data after being latched in the latch registers 94 in response to a latch signal is recorded using a strobe signal ST of 30 μs duration.

During the recording of the data for mainscan Line N subline 1 for color #1, the data for Line N subline 2 for color

2, i.e. red, is now output from line buffer B, 74b, to the printhead's shift registers 92. This data too is represented by 4864 binary bits. After being latched in the latch registers 94 this data is, in response to the next encoder pulse, recorded using a strobe signal of say 60 μs duration or a duration sufficient to reduce the charge on web 11 to $V_{dad}$. The different duration strobe signals ST, may be generated by the circuit 26 such as by programmable one-shots 116, 118 which in response to a signal from the LCU output a respective strobe signal whose duration is determined by a programmed count of high speed clock pulses from a master clock 121. The strobe signals produced in alternating sequence of the two different durations are output to the printhead 20 through OR logic gate 122. The sequence described above repeats for succeeding mainscan lines N+1, N+2 etc. Thus, as can be seen, a subline of recording pixels for each color is recorded during each mainscanning scanning line using a binary printhead.

Thus generally a printing apparatus has been described wherein a printhead is provided having M recording elements per inch (M>1) and is used in plural-color recording by recording plural sublines of a mainscan line (in this example 2 sublines) in an interval of 1/M. It will be appreciated, therefore, that more than two color images may be generated by creating more than two sublines per mainscan line and providing separate data for the third, fourth, etc. colors in accordance with the concepts disclosed herein. In addition to providing additional data, different strobe timing pulses may be provided for each subline of appropriate duration for each color as well as additional development stations for recording the additional colors. In lieu of adding additional circuits for additional colors, the circuitry may be simplified by reducing the number of buffers by increasing the rate of movement of data, effectively having data for different colors being sent at higher speeds. In this regard a multi-element printhead provides an advantage over a single exposure source laser ROS device. As indicated above, data is divided into data for odd and even LEDs and fed over two lines to the printhead. Thus, data rates to this printhead can be double that of a single ROS device. Furthermore, additional increases in data rates are possible by dividing each of the odd and even groups of LEDs into higher and lower numbered groups of LEDs with separate data lines for high and low numbered LEDs. This facilitates getting the data faster to the printhead for allowing multiple sub-lines to be recorded during each mainscan line.

Figure 5:
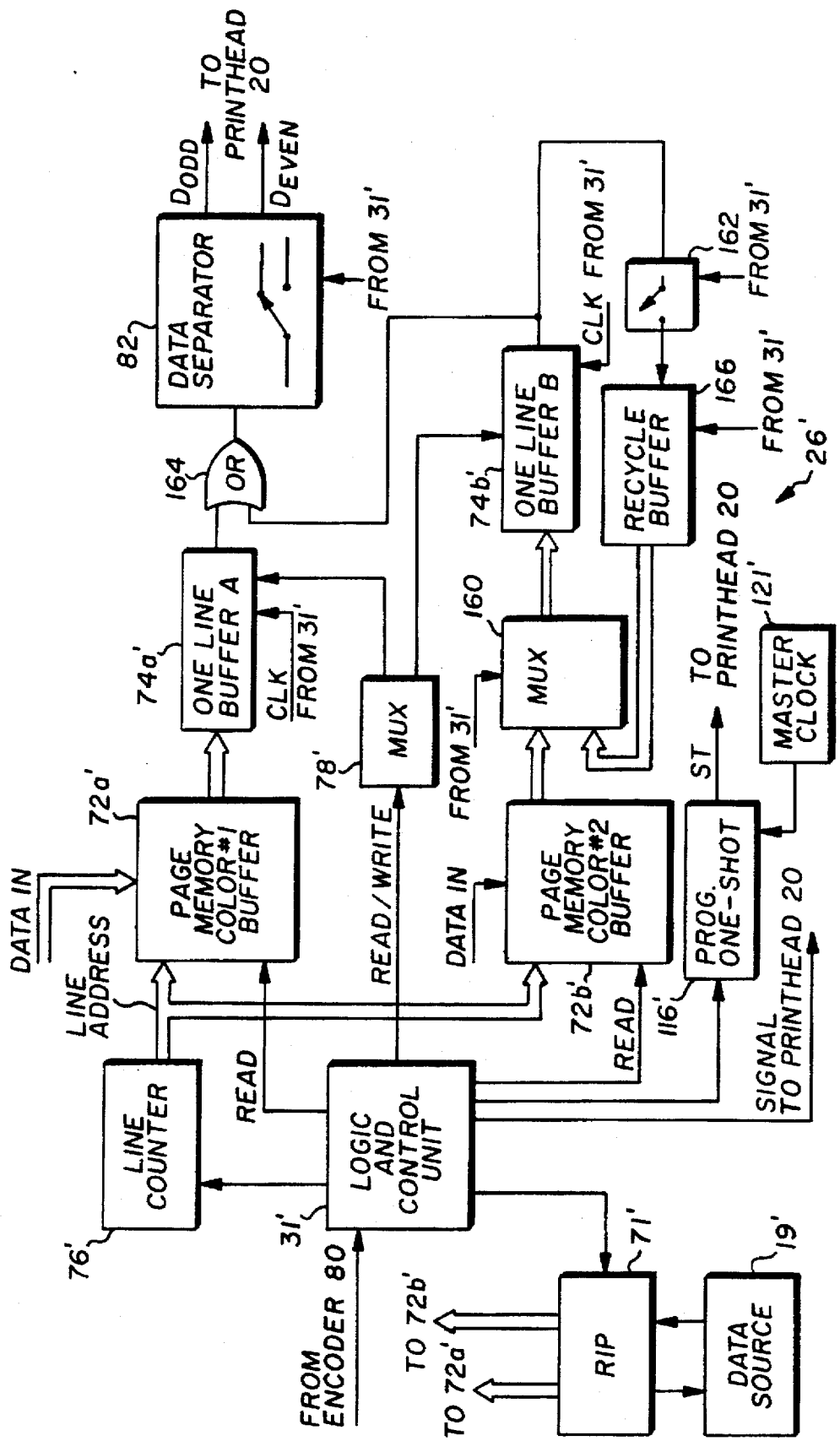
FIG. 5 is a block diagram of an alternative embodiment of an electronic system for driving a printhead in accordance with the invention.
Figure 6:
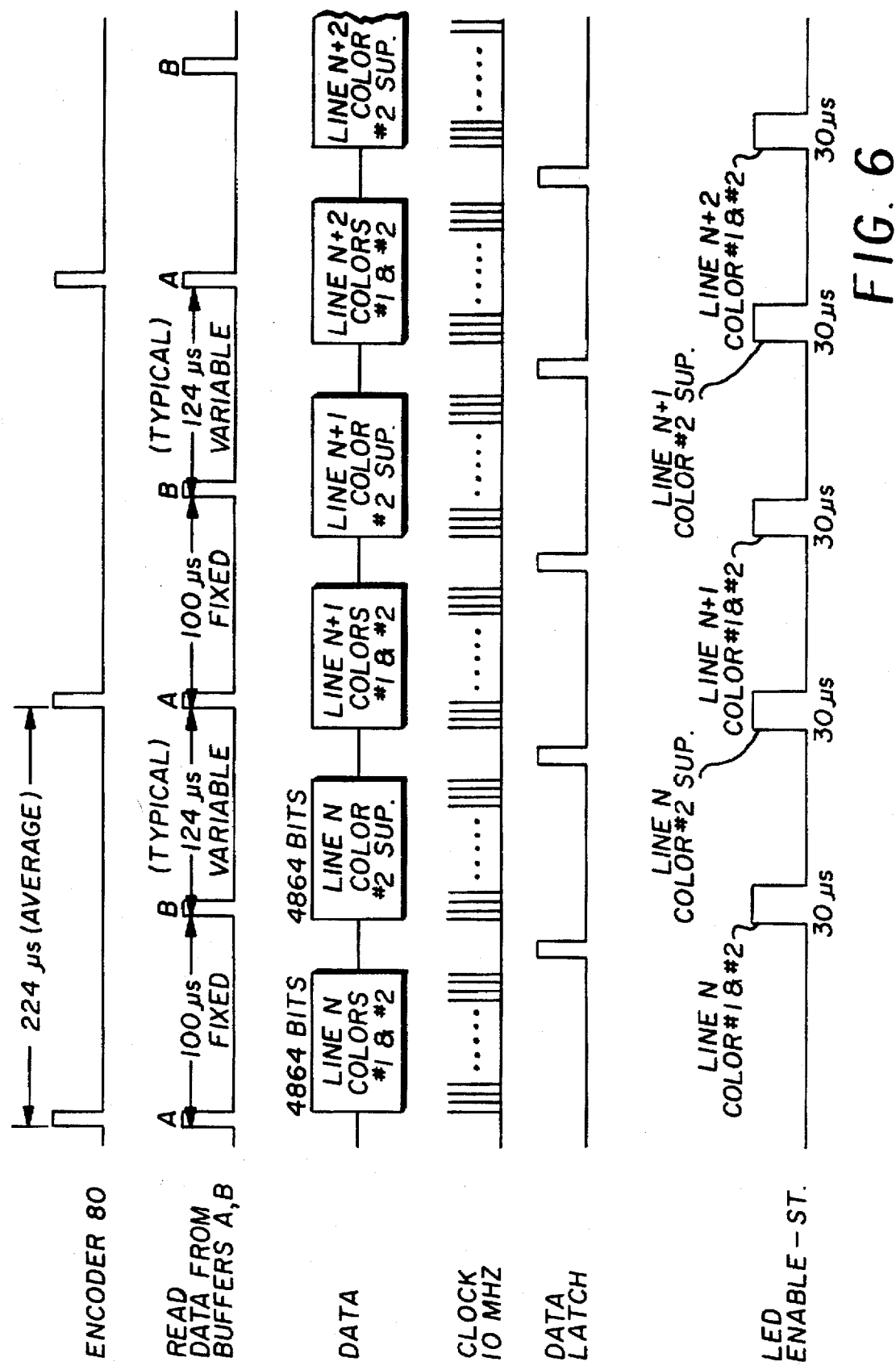
FIG. 6 is a diagram illustrating the timing of certain signals used in the embodiment of FIG. 5.

Reference will now be made to FIGS. 5 and 6 wherein an alternative embodiment is illustrated. The block diagram of FIG. 5 is similar to that illustrated in FIG. 2 and elements having a similar function have been identified with a prime (') after the corresponding number. In the embodiment of FIG. 2, it has been shown that two sublines are recorded for each 1/300 inches of movement of the web 11 in the subscanning direction. One subline records the pixels of one color and the other subline records the pixels of the other color with the binary printhead device. The circuit of FIG. 5 is similar to that of FIG. 2 in that two sublines are recorded for each 1/300 inches of movement of web 11 in the subscanning direction. However, in the embodiment of FIG. 5 the pixels of color #2 are recorded as a result of both sublines of exposure. In both embodiments an assumption is made that to record a pixel of color #2 requires an exposure duration that is twice that for recording a pixel of color #1. In the embodiment of FIG. 5 during recording of the first subline of data for each mainscan line data from each of buffers A and B, 74a' and 74b', are simultaneously shifted serially out as inputs to OR logic gate 164. Thus, a pixel will be recorded at a particular location on that subline in the event that a logic 1 bit exists for either color or both at that location. As the data is shifted out from buffer B, the data is recycled back to buffer B, 74b', through switch 162, recycle buffer 166 and multiplexer 160. This allows the data from buffer B to be output for the second subline of each mainscan line through OR gate 164 to printhead 20. During this second subline, the data is read from buffer B only and thus only this data gets a second or supplementary exposure. If the second or supplementary exposure is to be of different exposure duration than the initial exposure for the first subline, the circuitry illustrated in FIG. 2 of providing different strobe signals on line ST may be used and programmed appropriately. In addition, the circuitry for providing recycling of data is illustrative and buffers are available from which data can be written and not erased can be used instead. In this second embodiment, reliance is made upon having an overlap of exposures exist between adjacent sublines in a mainscan line. As the overlap can also exist between the exposure of a second subline and the first subline of the next mainscan line, it is expected that some softness or inaccuracy is created but the overall image might still appear satisfactory. The recorded pixels are developed with the respective color toners as described using the apparatus of FIG. 1. To minimize the softness in recording, the web 11 can be stopped or slowed at the exposure station during each mainscan recording interval so that the two sublines of exposures are superimposed.

Although the invention has been illustrated using electro-optical printheads with LEDs, other recording devices may also be used such as laser diodes in multiple arrays, liquid crystal displays. In addition, the invention is also applicable to electrographic recording too. In still another modification, an electrostatic image on the recording medium may be transferred to a secondary medium that is developed with toner and then transferred to a receiver sheet such as plain paper to form the permanent record. In the description provided above, the order of printing sublines 1 and 2 may be reversed.

The invention has been described with reference to illustrative preferred embodiments but variations and modifications are possible within the spirit and scope of the invention as defined by the following claims.

I claim:

1. A xerographic recording apparatus which comprises:

a recording medium for supporting electrostatic images;

a recording head having M recording elements per inch arranged in a row in a mainscan direction for recording on the recording medium, wherein M is a number greater than 1;

means for moving the recording medium in a subscan direction relative to the recording head;

means for enabling selected recording elements during each of at least two successive subline recording periods of each of plural main scan lines for recording a line of electrostatic pixel images on the recording medium, pixels from successive subline recording periods being recorded on said medium at successive adjacent subline recording locations, the at least two subline recording periods being defined within a time interval for 1/M inches or less of movement of the recording medium relative to the recording head in the subscan direction; and means, located downstream of said successive subline recording locations, for developing the electrostatic images recorded during each said interval with at least two differently colored toners to form a toner powder image.

2. The recording apparatus of claim 1 and including means for recording data, associated with pixels to be developed with one color toner, during one of said successive subline recording periods and for recording data, associated with pixels to be developed with a second color toner, during another of said two successive subline recording periods.

3. The recording apparatus of claim 1 and including means for recording data, associated with pixels to be developed with both of said colors, during one of said two successive subline recording periods and for recording of supplemental charge modulation data for completion of recording of pixels to be developed with only one of said colored toners during another of said two successive subline recording periods.

4. A method of xerographic recording which comprises:

advancing in a subscan direction a recording medium used for supporting electrostatic images past a recording head having M recording elements per inch arranged in a row in a mainscan direction for recording on the recording medium, M being a number greater than 1;

enabling selected recording elements during each of two successive subline recording periods of each of plural mainscan lines for recording electrostatic images, the two subline recording periods being defined within a time interval for 1/M inches or less of movement of the recording medium relative to the recording head in the subscanning direction and pixels from successive subline recording periods for each mainscan line being recorded on said medium at successive adjacent subline recording locations; and developing an electrostatic image recorded during said interval with two differently colored toners to form a toner powder image, said step of developing being downstream of said successive subline recording locations.

5. The method of claim 4 and including recording data, associated with pixels to be developed with one color toner, during one of said successive subline recording periods and recording data, associated with pixels to be developed with a second color toner, during the other of said two successive subline recording periods.

6. The method of claim 4 and including recording data, associated with pixels to be developed with both of said colors, during one of said two successive subline recording periods and recording of supplemental charge data for completion of recording of pixels to be developed with only one of said colored toners during the other of said two successive subline recording periods.

7. A xerographic method of electrostatic printing which comprises:

forming a uniform electrostatic charge on a light sensitive recording medium;

moving the recording medium relative to a printing head having a plurality of light emitting elements;

selectively enabling certain of the elements to record an electrostatic image on the medium during each of at least two successive in time subline recording periods of each of plural mainscan lines wherein image information for images to be developed in different colors are alternately recorded on different adjacent sublines; and developing the images on alternating adjacent sublines with differently colored toners to form a toner powder image.

\* \* \* \* \*